(12) United States Patent
Yoshino (10) Patent No.: US 7,611,171 B2
(45) Date of Patent: Nov. 3, 2009

(54) PIPING JOINT DEVICE

(75) Inventor: Makoto Yoshino, Okazaki (JP)

(73) Assignee: Denso Corporation, Kariya (JP)

( * ) Notice: Subject to any disclaimer, the term of this patent is extended or adjusted under 35 U.S.C. 154(b) by 525 days.

(21) Appl. No.: 11/396,995

(22) Filed: Apr. 3, 2006

(65) Prior Publication Data

US 2006/0220380 A1    Oct. 5, 2006

(30) Foreign Application Priority Data

Apr. 4, 2005   (JP) .............................. 2005-107808
Jan. 17, 2006  (JP) .............................. 2006-009111

(51) Int. Cl.
*F16L 39/00* (2006.01)

(52) U.S. Cl. .............................. 285/319; 285/1; 285/83; 285/322; 285/921

(58) Field of Classification Search .................... 285/1, 285/83, 93, 305, 319, 321, 322, 374, 921, 285/924
See application file for complete search history.

(56) References Cited

U.S. PATENT DOCUMENTS

| | | | | |
|---|---|---|---|---|
| 5,641,237 | A | * | 6/1997 | Albert et al. ................ 403/372 |
| 5,725,257 | A | * | 3/1998 | Sakane et al. ................ 285/81 |
| 6,213,677 | B1 | * | 4/2001 | Yamane et al. .............. 403/329 |
| 7,178,837 | B2 | * | 2/2007 | Yoshino ..................... 285/305 |
| 7,354,078 | B2 | * | 4/2008 | Yoshino ..................... 285/319 |
| 2005/0110274 | A1 | | 5/2005 | Yoshino |
| 2005/0161946 | A1 | * | 7/2005 | Bauer ........................ 285/305 |
| 2005/0258644 | A1 | | 11/2005 | Yoshino |

FOREIGN PATENT DOCUMENTS

CA       1320235 C   *  7/1993
JP    2004-183703       7/2004

OTHER PUBLICATIONS

Office Action dated Jan. 25, 2008 in Chinese Patent Application No. 2006 10071912.3 with English translation thereof.

* cited by examiner

*Primary Examiner*—James M Hewitt
*Assistant Examiner*—Jay R Ripley
(74) *Attorney, Agent, or Firm*—Harness, Dickey & Pierce, PLC (57) ABSTRACT

A piping joint device for connecting a first piping member having a male joint and a second piping member having a female joint includes: a piping joint member provided with a plurality of diametrically deformable engagement portions; and a plurality of window portions provided in an extension cylinder portion of the second piping member to be engaged with the engagement portions. The male joint of the first piping member is inserted into the female joint of the second piping member in one touch by using deformation of the engagement portions, and a detent portion is provided at an engagement position where the engagement portions engage with the first piping member to prevent a rotation.

7 Claims, 7 Drawing Sheets

PIPE EXPANDING

FIG. 4B

PRESS-CONTACTING

PIPING JOINT DEVICE

CROSS REFERENCE TO RELATED APPLICATION

This application is based on Japanese Patent Applications No. 2005-107808 filed on Apr. 4, 2005, and No. 2006-9111 filed on Jan. 17, 2006, the contents of which are incorporated herein by reference in its entirety.

BACKGROUND OF THE INVENTION

1. Field of the Invention

The present invention relates to a piping joint device which includes a piping joint member for connecting a first fluid piping member having a male joint and a second fluid piping member having a female joint. The piping joint device is suitably used for a piping joint of, for example, refrigerant piping members of a refrigerating cycle for vehicular air conditioning.

2. Description of Related Art

Conventionally, in this type of piping joint device having a piping joint for connecting a first piping member having a male joint and a second piping member having a female joint, the piping joint includes a pair of first slots formed in opposite positions relative to an axis from one end of a cylindrical-shaped body. Further, engagement portions projecting toward the axis are formed at plural positions on a thin wall portion on a circumference at both ends of the body, on which the first slots or second slots are not formed.

When the piping joint is mounted to one of the first piping member and the second piping member and connects to the other one of the first piping member and the second piping member, on which the piping joint is not mounted, the engagement portions of the piping joint are enlarged/reduced in diameter for insertion and fixation in one touch (see, for example, JP-A-2004-183703).

The male joint of the first piping member is inserted into the female joint of the second piping member, so that the piping joint mounted to the second piping member enables connection to the first piping member in one touch. However, in the case where this piping joint device is applied to a rubber hose, movement between the male joint and the female joint is caused in a direction of rotation because the piping joint is mounted rotatably to the second piping member. Thus, rotation of either of the first piping member and the second piping member accompanies the movement.

When such accompanying rotation occurs, there is a fear of disadvantages such as interference with other parts in the vicinity of the rubber hose due to dispersion in a mounted state of the rubber hose, wear of airtight portions between the joints, leakage of a refrigerant due to vibrations, etc.

SUMMARY OF THE INVENTION

The present invention has been thought of in view of the situation and has its object to provide a piping joint device, in which detent of a first piping member and a second piping member can be obtained without an increase in the number of parts, and a method of manufacturing the device.

According to an aspect of the present invention, in a piping joint device for connecting a first piping member and a second piping member, a piping joint member includes: a body portion with an approximately cylindrical shape having a plurality of slot portions which are positioned at equal intervals from an axis and extend axially from an end surface of the body portion; and a plurality of diametrically deformable engagement portions provided on a circumference of the body portion to extend toward the axis, at positions where the slot portions are not provided. The piping joint device further includes an extension cylinder portion formed on an end of the second piping member to be made integral with the female joint, and extending toward the first piping member, and a plurality of window portions provided in the extension cylinder portion along a circumferential direction of the extension cylinder portion to be engaged with the engagement portions. In this device, the male joint of the first piping member is inserted into the female joint of the second piping member in one touch by using deformation of the engagement portions, the piping joint member and the first piping member are provided with a detent portion at an engagement position where the engagement portions engage with the first piping member, and the detent portion is provided to prevent a rotation of the first piping member and the second piping member which are connected to each other.

Accordingly, the function of connection of piping and the function of detent can be made compatible with each other in the engagement position where the engagement portions are engaged with the first piping member. Accordingly, detent function of the first piping member and the second piping member can be obtained without an increase in the number of parts.

An engaged portion can be provided on an outer periphery of a root portion of the male joint of the first piping member to be engaged with the engagement portions. In this case, the detent portion is constructed with a first step portion provided on the engagement portions, and a second step portion provided on the engaged portion and opposite to the first step portion to be engaged with the first step portion. Furthermore, the first step portion is fitted with the second step portion to prevent a rotation of the first piping member and the second piping member. Here, the engaged portion can be formed separate from the first piping member to have a substantially cylindrical shape, and can be fixed to an outer periphery of the first piping member.

Alternatively, an expanded portion can be provided integral with a root portion of the male joint of the first piping member to engage with the engagement portions. In this case, the detent portion is constructed with a first step portion provided on the engagement portions, and a second step portion provided on the expanded portion and opposite to the first step portion to be engaged with the first step portion. Furthermore, the first step portion is fitted with the second step portion to prevent a rotation of the first piping member and the second piping member.

In this piping joint device, the piping joint member can be located on an outer periphery of the second piping member such that the engagement portions are inserted into the window portions and are engaged with the first piping member in the circumferential direction.

According to another aspect of the present invention, in a piping joint device, a piping joint member and the first piping member are provided with a detent portion at a fixing portion of the piping joint portion fixed to the first piping member, and the detent portion is provided to prevent a rotation of the first piping member and the second piping member which are connected to each other. In this case, the fixing portion of the piping joint member is located on an outer periphery of the first piping member such that the engagement portions are inserted into the window portions. Accordingly, connection function for connecting the first and second piping members and detent function of the first piping member and the second piping member can be obtained.

In this piping joint device, an engaged portion can be provided on an outer periphery of a root portion of the male joint of the first piping member to be engaged with fixing portion of the piping joint member. In this case, the detent portion is constructed with a first step portion provided on the fixing portion of the piping joint member, and a second step portion provided on the engaged portion and opposite to the first step portion to be engaged with the first step portion. Further, the first step portion is fitted with the second step portion to prevent a rotation of the first piping member and the second piping member.

Alternatively, an expanded portion can be provided integral with a root portion of the male joint of the first piping member to engage with the fixing portion of the piping joint member. In this case, the detent portion can be constructed with a first step portion provided on the fixing portion of the piping joint member, and a second step portion provided on the expanded portion and opposite to the first step portion to be engaged with the first step portion. Furthermore, the first step portion can be fitted with the second step portion to prevent a rotation of the first piping member and the second piping member.

According to an another aspect of the present invention, a method for manufacturing a piping joint device includes a step of forming a first piping member having a male joint; a step of forming a second piping member having a female joint; a step of fixing a piping joint member having a plurality of diametrically deformable engagement portions to an outer periphery of the second piping member such that the engagement portions are inserted into window portions provided in an extending cylinder portion at an end of the second piping member, and a step of inserting the male joint of the first piping member into the female joint of the second piping member. Furthermore, the step of forming the first piping member includes a step of arranging an engaged member having an approximately cylindrical shape on an outer surface of the first piping member, and a step of expanding the first piping member while fastening the engaged member inwardly so as to fixing the engaged member onto the first piping member. In this method, the piping joint member and the first piping member form a detent portion at an engagement position where the engagement portions engage with the engaged member on the first piping member after the inserting. Accordingly, the engaged member can be easily formed on the first piping member.

BRIEF DESCRIPTION OF THE DRAWINGS

The above and other objects, features and advantages of the present invention will become more apparent from the following detailed description of preferred embodiments made with reference to the accompanying drawings, in which.

DESCRIPTION OF THE PREFERRED EMBODIMENTS

First Embodiment

The first embodiment of the present invention will be now described with reference to FIGS. 1-7.

Figure 1:
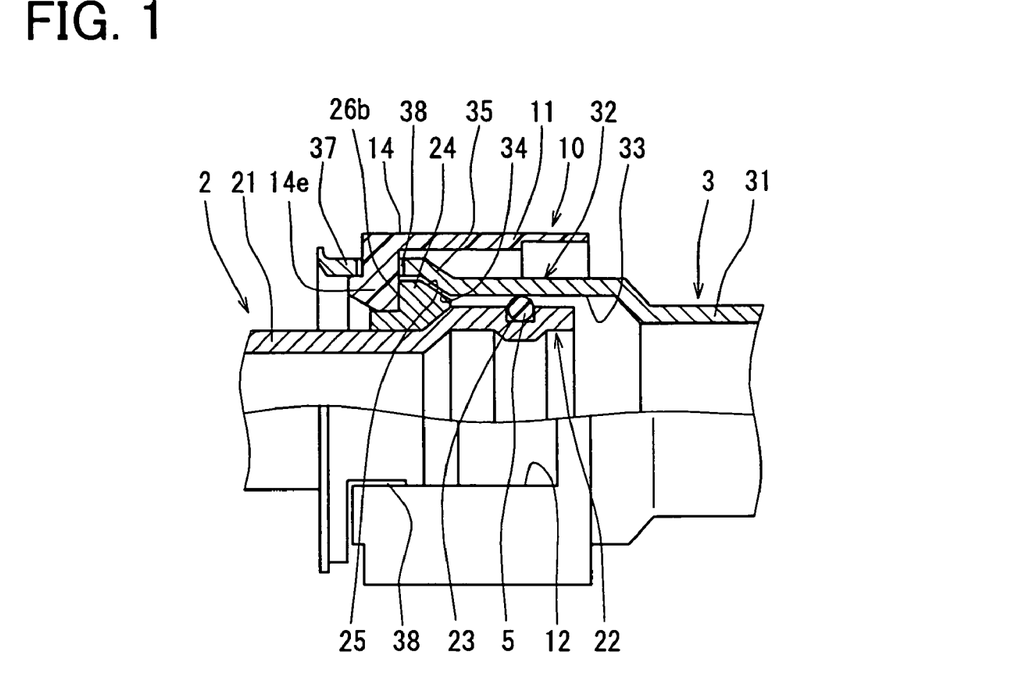
FIG. 1 is a partial cross-sectional view showing a construction of a piping joint device according to a first embodiment of the present invention.
Figure 5:
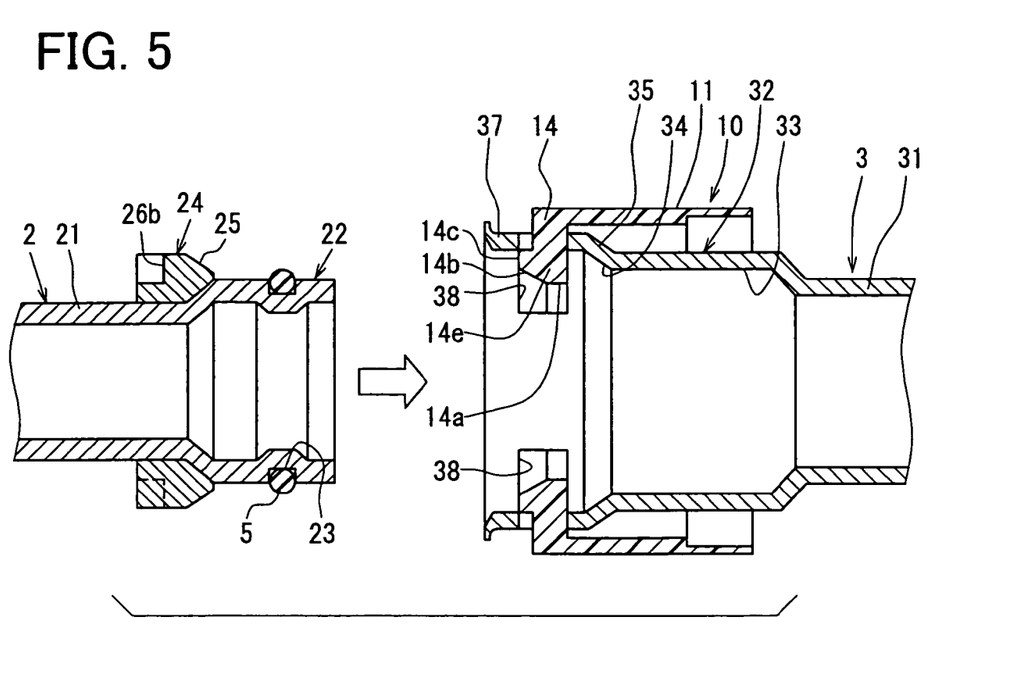
FIG. 5 is a cross-sectional view showing a configuration before insertion of the first piping member into a second piping member in the first embodiment of the present invention.

A piping joint device according to the first embodiment is structured, as shown in FIGS. 1 and 5, such that a first piping member 2 having a male joint is engaged through a window portion 38, which is formed on a second piping member 3 having a female joint, with a piping joint member 10. The piping joint member 10 is mounted to the second piping member 3.

The first piping member 2 is formed to be cylindrical-shaped in order to permit flow of a refrigerant, and a tip end thereof on an insertion side is formed as a male-side joint portion (male joint) 22 being enlarged in diameter relative to a cylinder portion 21. The joint portion 22 is formed with a groove 23, into which an O-ring 5 being an airtight member is fitted, and an engaged member 24 (engaged portion) formed to be substantially cylindrical-shaped is arranged on an opposite side of the groove 23 relative to a tip end side thereof.

The engaged member 24 is a member being engaged with engagement portions 14, described later, of the piping joint member 10. The engaged member 24 is separate from the first piping member 2 to be formed into a predetermined shape according to the embodiment. The engaged member 24 is made integral with an outer periphery of a root portion of the joint portion 22 of the first piping member 2 by means of a caulking fixation method described later.

Figure 2A:
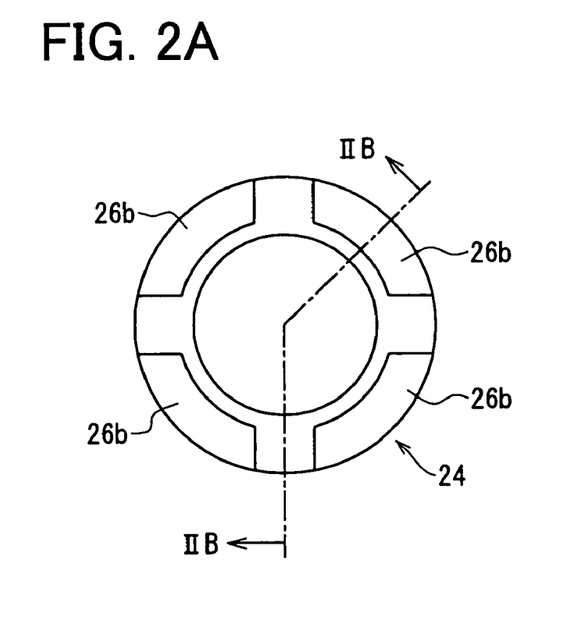
FIG. 2A is a side view showing a construction of an engaged member in the first embodiment of the present invention.
Figure 2B:
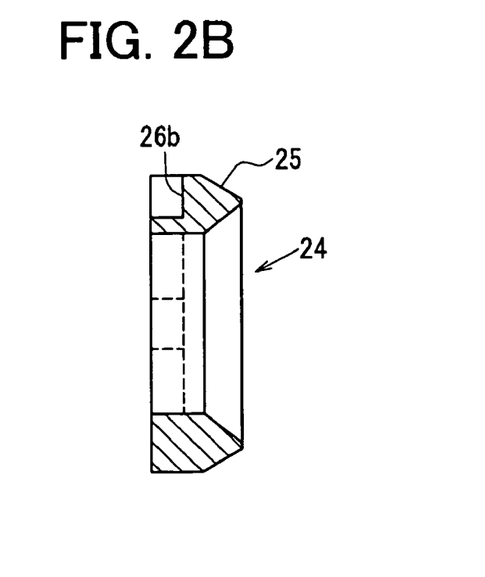
FIG. 2B is a cross-sectional view taken along the line IIB-IIB in FIG. 2A.

The engaged member 24 is specifically shaped as shown in FIGS. 2A and 2B such that an outward part thereof is enlarged in diameter outwardly of an axis of the engaged member 24 to have a substantially cylindrical-shaped cross section, and concave-shaped grooves 26b are formed at four locations circumferentially on an end surface of the engaged member 24 to engage with the engagement portions 14, described later, of the piping joint member 10. Described later in detail, the first piping member 2 is inserted into an inner cylinder of the engaged member 24 to be united and integrated therewith.

In addition, the grooves 26b are formed to have a width of substantially the same size as the engagement portions 14 so that the engagement portions 14 engage therewith not to rotate in a circumferential direction when the engagement portions 14 engage therewith. The engaged member 24 may be formed by means of any one of forging, die casting, press-forming, or cutting, in which a metallic material such as aluminum, iron, etc. is used. The engaged member 24 may be formed from a molding, in which a resin material is used. The reference numeral 25 shown in the figure denotes a tapered outer surface. The tapered outer surface 25 is formed to abut against a tapered inner surface 34, described later, of the second piping member 2.

The second piping member 3 is formed to be cylindrical-shaped in order to permit flow of a refrigerant, and a tip end thereof on an insertion side is formed as a female-side joint portion (female joint) 32 being enlarged in diameter relative to a cylinder portion 31. The joint portion 32 includes: an insertion port 33, into which the joint portion 22 of the first piping member 2 is fitted; an insertion-port tip end tapered portion 35 having the tapered inner surface 34 to abut against the tapered outer surface 25 of the first piping member 2; and an extension cylinder portion 37 provided to extend forward from the tapered portion 35. The extension cylinder portion 37 is formed with a pair of window portions 38, which are positioned to be opposed to each other with respect to an axis thereof.

The outside diameter of the extension cylinder portion 37 is formed to have substantially the same diameter as an outside diameter of the tapered portion 35. The engagement portions 14, described later in detail, of the piping joint member 10 are inserted into the window portions 38.

Figure 3A:
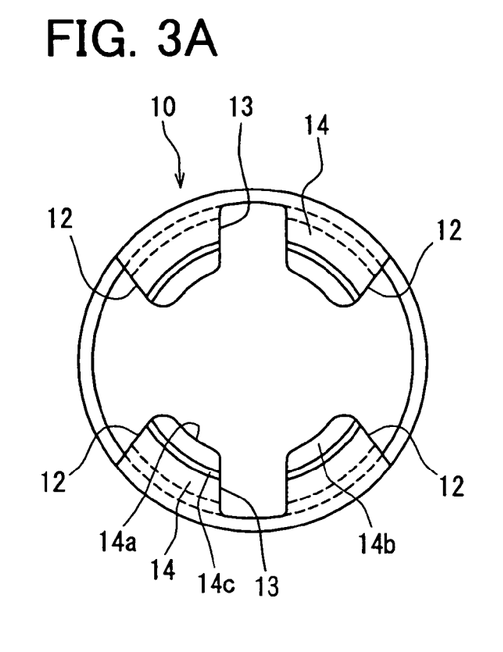
FIG. 3A is a side view showing a construction of a piping joint member in the first embodiment of the present invention.
Figure 3B:
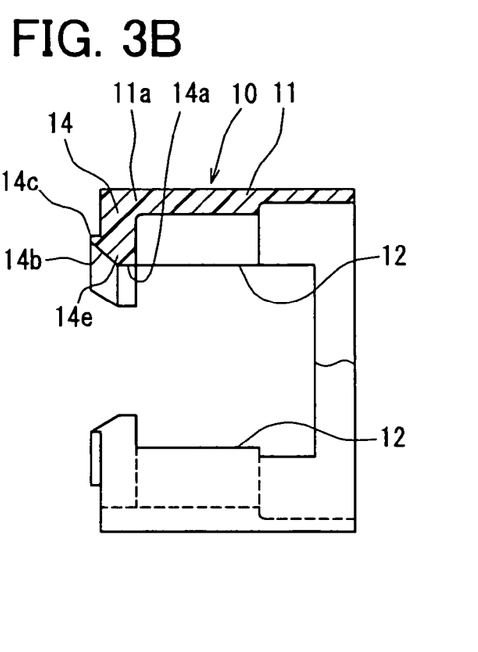
FIG. 3B is a partial cross-sectional view of FIG. 3A.

The piping joint member 10 is formed integrally, as shown in FIGS. 3A and 3B, from a resin material, or a metallic material, or a mixture of a resin material and a metallic material to be elastic in an axial direction and a radial direction. The piping joint member 10 has a first body ring portion 11 (body portion) formed to be thin-walled and ring-shaped so as to be mounted on an outer periphery of the second piping member 3. Further, first slot portions 12 are formed to be opened from one end of a first body ring portion 11 that is a first ring-shaped thin wall portion, and are arranged in symmetric positions on a circumference.

The first slot portions 12 are formed as shown in FIG. 3B to extend from a left end of the first body ring portion 11 to a neighborhood of a right end thereof, and are opened at the left end thereof. The first slot portions 12 are formed in pair to be opposed to each other in symmetric positions with respect to an axis of the first body ring portion 11.

The engagement portions 14 projecting toward the axis are formed on the thin wall portions, on which the slot portions are not formed, on both ends of the first body ring portion 11. A set of the engagement portions 14 are arranged on both sides from thin wall ends 11a of the first body ring portion 11, on which the first slot portions 12 are not formed, with the first slot portions 12 therebetween, and a set of the engagement portions 14 are formed in symmetric positions to project toward the axis and to be opposed to each other.

A pair of the engagement portions 14 opposite to each other are divided by forming slits 13 in circumferentially middle positions so that each engagement portion 14 is divided into two parts. Therefore, the set of the engagement portions 14 includes four engagement portions 14 which are formed on a circumference as shown in FIG. 3A. The window portions 38 formed on the second piping member 3 are formed in circumferentially opposite positions of the engagement portions 14 with respect to an axis.

Each of the engagement portions 14 is provided with a straight portion 14a on an inner peripheral portion thereof, a tapered surface portion 14b enlarged in diameter from the straight portion 14a toward an end surface, and a projection 14c at a distal end of the tapered surface portion 14b. The projection 14c is formed so that after the first piping member 2 and the second piping member 3 are connected to each other, a fluid is charged in the first and second piping members 2, 3 and when an internal pressure is high, an outer peripheral surface of the projection 14c toward a tip end thereof abuts against an inner peripheral side of the extension cylinder portion 37 to thereby engage the engagement portions 14 with the window portions 38 as shown in FIG. 1.

The reference numeral 14e shown in the figure denotes a pawl portion that is an engagement surface step portion of the engagement portion 14 to be formed convex. The pawl portions 14e engage with the grooves 26b formed on the engaged member 24 so as to connect the first piping member 2 and the second piping member 3 to each other and to achieve detent of the first piping member 2 and the second piping member 3 in a circumferential direction. Thus, the pawl portions 14e and the grooves 26b construct a detent portion of the present invention.

The window portions 38 formed on the extension cylinder portion 37 of the second piping member 3 are formed in regions opposed to the four engagement portions 14, that is, circumferentially opposite regions of the extension cylinder portion 37 with respect to an axis. In the piping joint member 10 according to the embodiment, the first slot portions 12 are formed at two locations on a circumference and the engagement portions 14 are formed at four locations on a circumference. However, the first slot portions 12 may be formed at three or more locations on a circumference provided that they are disposed at equal intervals from an axis, and sets of the engagement portions 14 with the slot therebetween may also be formed at three locations corresponding to the slot portions instead of four locations.

According to the first embodiment, the slits 13 are formed in circumferentially middle positions of the opposite engagement portions 14 so that the engagement portions 14 are formed in four on a circumference. However, two opposite engagement portions 14 may be formed on a circumference instead of forming the slits 13.

Figure 4A:
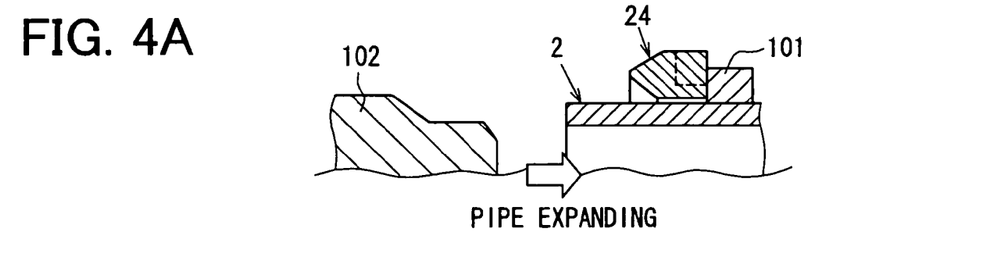
FIGS. 4A to 4C are views illustrating the working procedure of a caulking fixation method of assembling an engaged member to a first piping member in the first embodiment of the present invention.
Figure 4B:
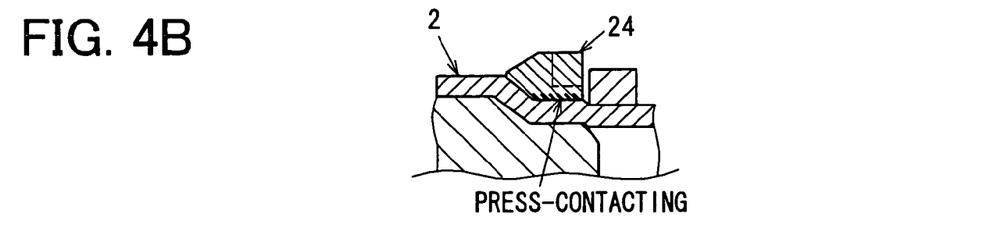
Figure 4C:
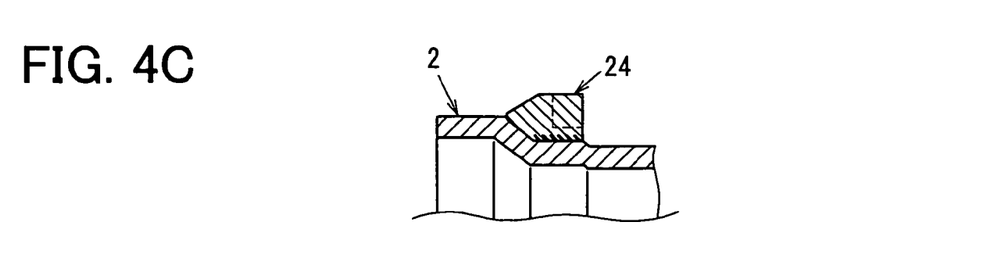

The caulking fixation method, by which the engaged member 24 is made integral with the first piping member 2, will be described with reference to FIGS. 4A-4C. As shown in FIG. 4A, the first piping member 2 is held in a predetermined holding position by means of a piping holding chuck 101. The engaged member 24 is arranged on the first piping member 2 so as to abut against one surface of the piping holding chuck 101. Accordingly, the engaged member 24 is arranged on the root portion of the joint portion 22.

A pipe expanding punch 102 is inserted into an inner cylinder of the first piping member 2 to perform a pipe expanding work for expanding an inside diameter of the first piping member 2. The first piping member 2 is expanded whereby the first piping member 2 is formed as shown in FIG. 4B to follow an outward shape of the pipe expanding punch 102. In this case, an inner peripheral surface of the engaged member 24 and an outer peripheral surface of the first piping member 2 are subjected to caulking and crimping. Therefore, the inner peripheral surface of the engaged member 24 press-contacts the outer peripheral surface of the first piping member 2. As shown in FIG. 4C, the pipe expanding work is terminated by releasing the pipe expanding punch 102 and the piping holding chuck 101.

Accordingly, the engaged member 24 is made integral with the outer periphery of the first piping member 2. According to the embodiment, the engaged member 24 is made integral by means of the pipe expanding work or the caulking fixation method. However, this is not limitative but the engaged member 24 may be fitted onto the outer periphery of the first piping member 2. Otherwise, the engaged member 24 may be fixed to the outer periphery of the first piping member 2 by means of any one of bonding, welding, and brazing.

Figure 6:
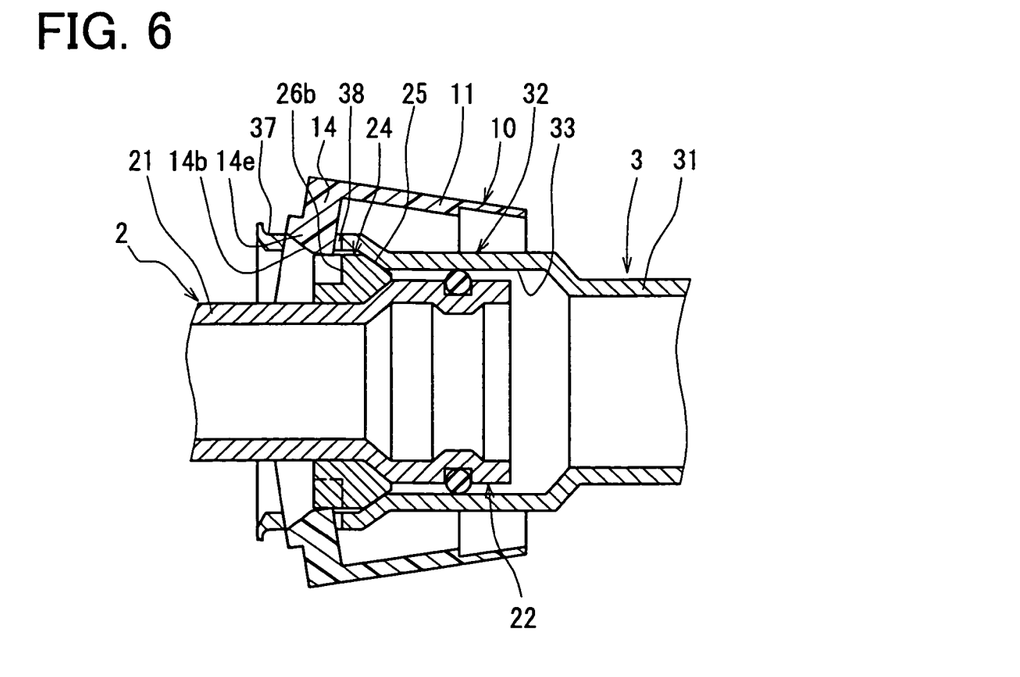
FIG. 6 is a cross-sectional view showing an operation state when the first piping member is inserted into the second piping member in the first embodiment of the present invention.

Subsequently, a method of assembling the piping joint device according to the first embodiment will be described with reference to FIGS. 1 and 5 to 7. FIG. 5 is a cross-sectional view showing a state before the first piping member 2 is inserted into the second piping member 3, and FIGS. 6 and 7 are cross-sectional views showing an operation state where the first piping member 2 is inserted into the second piping member 3.

First, as shown in FIG. 5, the piping joint member 10 is mounted on the second piping member 3 so that the engagement portions 14 are inserted into the window portions 38. After the joint portion 22 of the first piping member 2 is arranged at a position opposed to the extension cylinder portion 37 of the second piping member 3, the joint portion 22 of the first piping member 2 is inserted into the extension cylinder portion 37 as shown in FIG. 6.

Accordingly, the tip end portion of the joint portion 22 is accommodated in the insertion port 33 of the second piping member 3, and the engaged member 24 of the first piping member 2 pushes the tapered surface portion 14b of the piping joint member 10 when the joint portion 22 is inserted into the insertion port 33, whereby the engagement portions 14 are enlarged radially in diameter with the first body ring portion 11 as a fulcrum to be detached from the window portions 38.

Figure 7:
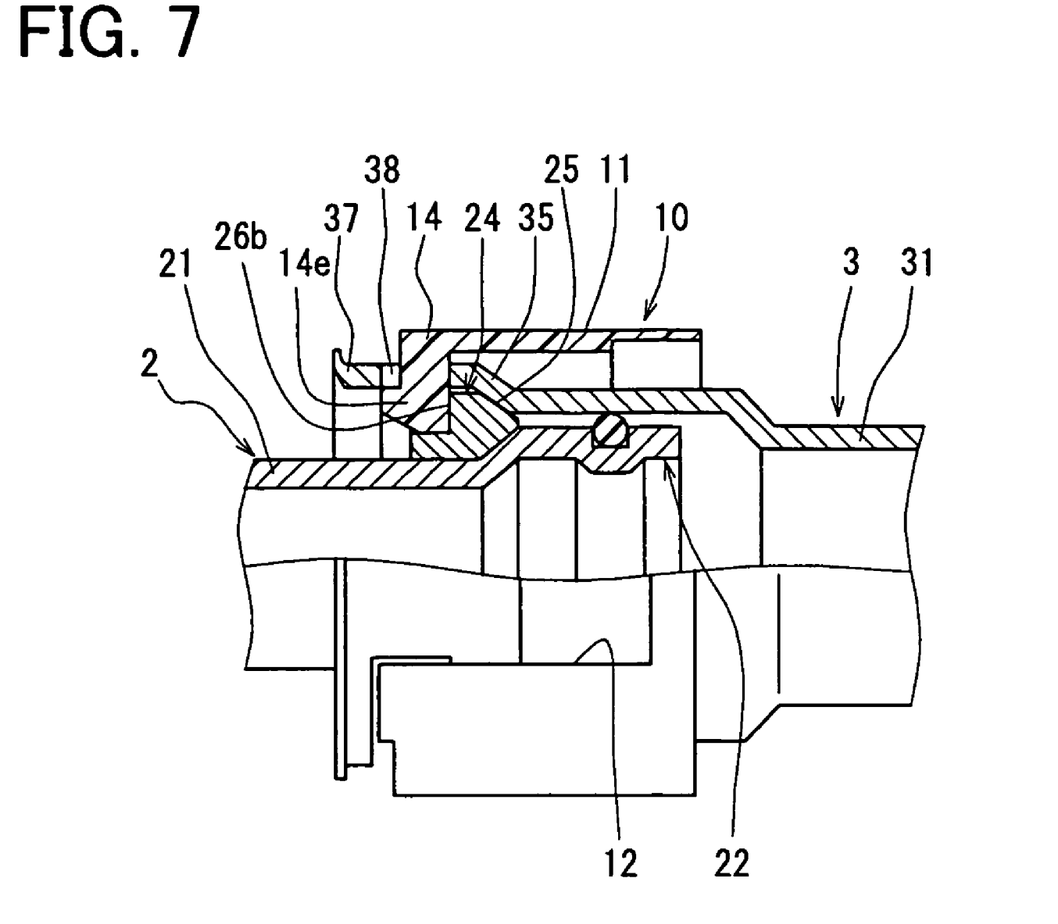
FIG. 7 is a cross-sectional view showing a working configuration when the first piping member is inserted into the second piping member in the first embodiment of the present invention.

When the tapered outer surface 25 formed on the engaged member 24 of the first piping member 2 abuts against the tapered inner surface 34 formed on the second piping member 3 as shown in FIG. 7, the piping joint member 10 is elastically restored to enter into the window portions 38 of the extension cylinder portion 37. Therefore, inner wall surfaces of the pawl portions 14e of the engagement portions 14 engage with the grooves 26b formed on the engaged member 24 of the first piping member 2 and the straight portions 14a of the engagement portions 14 abut against inner peripheral surfaces of the grooves 26b of the engaged member 24.

Accordingly, the engagement portions 14 is supported by the window portions 38 formed on the second piping member 3, so that the first and second piping members 2, 3 are constrained together axially and the first piping member 2 is connected to the second piping member 3 in one touch. Since the pawl portions 14e of the engagement portions 14 engage with the grooves 26b, detent between the first piping member 2 and the second piping member 3 is achieved.

That is, it is possible to obtain the function of connection of piping and the function of detent compatible with each other in a region, in which the pawl portions 14e of the engagement portions 14 engage with the first piping member 2. Accordingly, a detent structure of the first piping member 2 and the second piping member 3 can be formed without an increase in the number of parts for addition of the function of detent.

Since the detent function can be achieved, it can restrict disadvantages such as interference with other parts in the vicinity of the piping, wear of airtight portions between the joints, leakage of a refrigerant due to vibrations, etc.

When an internal fluid is charged in the first and second piping members 2, 3 to cause an increase in internal pressure, the first piping member 2 is moved axially by the internal pressure and the inner wall surfaces of the pawl portions 14e of the engagement portions 14 engaged with the grooves 26b are moved axially, so that the projection 14c of the engagement portions 14 are engaged with the window portions 38.

Accordingly, the engagement portions 14 of the piping joint member 10 cannot be removed from the window portions 38. That is, a disassembly where the engagement portions 14 are removed from the window portions 38 cannot be performed when an internal fluid remains in the first and second piping members 2, 3 to make the internal pressure high. The disassembly can be performed after the pressure remaining in locations of connection is eliminated.

According to the embodiment, one groove 23, into which the O-ring 5 is fitted, is formed on the joint portion 22 of the first piping member 2. However, this is not limitative but two or more grooves 23 may be formed to have a plurality of O-rings 5 fitted thereinto so that the joint portion 22 and the insertion port 33 are made airtight.

In the piping joint device according to the first embodiment, the piping joint member 10 and the first piping member 2 include the detents (14e, 26b) at positions, in which the engagement portions 14 engage with the first piping member 2. Further, the detents (14e, 26b) are provided in such a manner that the first piping member 2 and the second piping member 3 are connected to each other without rotation in the circumferential direction.

Accordingly, it is possible to make the function of connection of piping and the function of detent compatible with each other in a region, in which the engagement portions 14 engage with the first piping member 2. Therefore, the detent function between the first piping member 2 and the second piping member 3 can be obtained without an increase in the number of parts for addition of the detent function.

The engaged member 24 being engaged with the engagement portions 14 is provided on the outer periphery of the root portion of the joint portion 22 of the first piping member 2, the concave-shaped grooves 26b are provided on the predetermined surface of the engaged member 24 to be engaged with the engagement portions 14, the convex-shaped pawl portions 14e are provided on the engagement portions 14, and the pawl portions 14e are fitted into the grooves 26b to have the detent function between the first piping member 2 and the second piping member 3. Therefore, the pawl portions 14e are held in the grooves 26b to prevent a rotation of the first piping member 2 and the second piping member 3.

The engaged member 24 is separate from the first piping member 2, and is formed to have a substantially cylindrical-shaped cross section. Furthermore, the engaged member 24 is arranged on the outer peripheral surface of the first piping member 2, and the first piping member 2 is expanded, so that the engaged member 24 is fixed to the first piping member 2. Thus, the substantially cylindrical-shaped engaged member 24 can be formed on the first piping member 2 by means of the pipe expanding work. Accordingly, the first piping member 2 with the engaged member 24 can be formed without an increase in manufacturing cost.

Second Embodiment

In the above-described first embodiment, the engaged member 24 being engaged with the engagement portions 14 is formed separate from the first piping member 2, and is provided integral with the first piping member 2. However, this is not limitative, and the engagement portions 14 may be directly engaged with an expanded portion, which is formed in the joint portion 22 of the first piping member 2 to project outward.

Figure 8A:
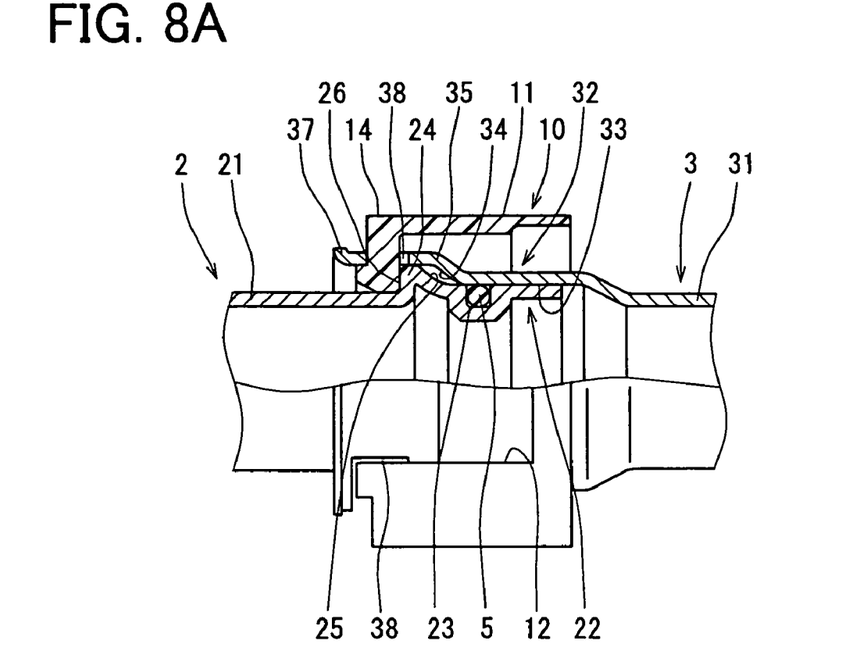
FIGS. 8A and 8B are partial cross-sectional views each showing a construction of a piping joint device according to a second embodiment of the present invention.
Figure 8B:
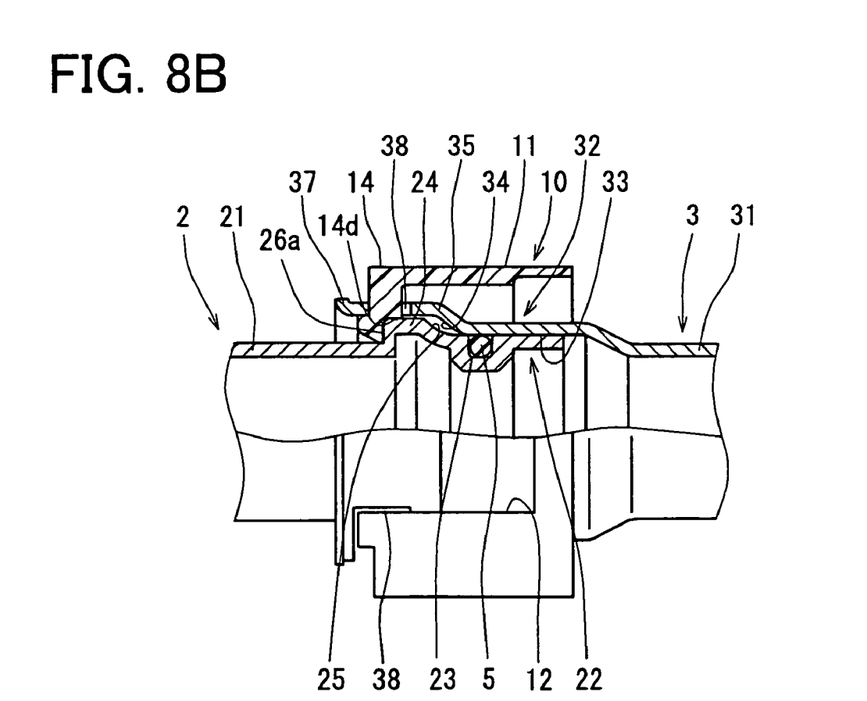

Specifically, in the second embodiment, a joint portion 22 of a first piping member 2 is formed, as shown in FIG. 8A or 8B, to have an outwardly projecting expanded portion 24, a tapered outer surface 25 formed forwardly of the expanded portion 24 to be decreased in diameter toward the tip end, and a step surface between a cylinder 21 arranged rearwardly of the expanded portion 24 and the expanded portion 24. This step surface between the cylinder 21 and the expanded portion 24 is used as a rear end engagement portion 26 being engaged with an engagement portion 14 of a piping joint member 10.

In addition, in the second embodiment, four convex-shaped projections 26a (see FIGS. 8B and 9A) that are step portions for engagement are formed at predetermined equal intervals in a circumferential direction of the rear end engagement portion 26. Furthermore, concave-shaped grooves 14d that are step portions for engagement, into which the projections 26a are fitted, are formed on the engagement portion 14 of the piping joint member 10. The grooves 14d of the engagement portion 14 engages with the projections 26a.

Accordingly, the concave-shaped grooves 14d are held on the convex-shaped projections 26a whereby detent structure of a first piping member 2 and a second piping member 3 can be obtained. Further, since the projections 26a can be formed by adding at least one step to the forming work of the expanded portion 24, it is possible to achieve reduction in manufacturing cost as compared with the case where the engaged member 24 is formed separately from the first piping member 2.

In the second embodiment, the other parts can be formed similarly to the above-described first embodiment.

According to the second embodiment, the expanded portion 24 serving as the engaged member 24 of the above-described first embodiment is formed integral with the first piping member 2, the convex-shaped projections 26a are formed on the rear end engagement portion 26 of the expanded portion 24 in a circumferential direction, the concave-shaped grooves 14d opposed to the convex-shaped projections 26a are formed on the engagement portion 14, and the concave-shaped grooves 14d engage with the convex-shaped projections 26a. Accordingly, the detent function between the first piping member 2 and the second piping member 3 can be obtained similarly to the above-described first embodiment.

Figure 9A:
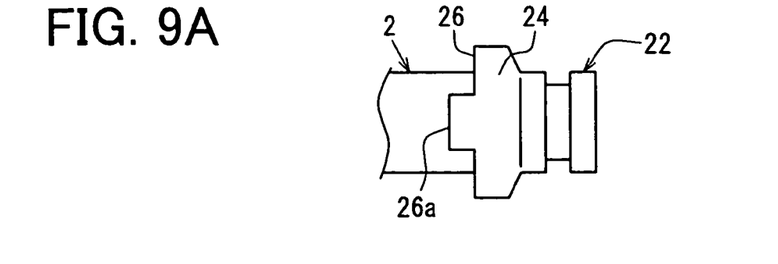
FIG. 9A is a schematic view showing a shape of an engaged surface step portion in the second embodiment of the present invention.
Figure 9B:
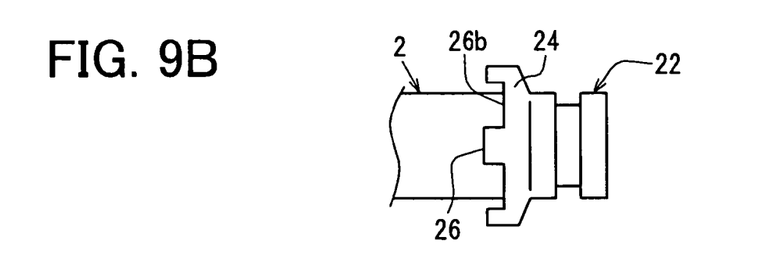
FIGS. 9B to 9E are schematic views each showing the shape of the engaged surface step portion in the second embodiment of the present invention.

In the second embodiment, the projections 26a having a shape shown in FIG. 9A are not limitative but step portions having a shape shown in FIGS. 9B to 9E may be formed in the expanded portion 24 of the joint portion 22 of the first piping member 2. Specifically, as shown in FIG. 9B, four concave-shaped grooves 26b can be formed at predetermined equal intervals on the rear end engagement portion 26 of the expanded portion 24 in a circumferential direction, and convex-shaped projections (not shown) opposed to the concave-shaped grooves 26b can be formed on the engagement portion 14.

Figure 9C:
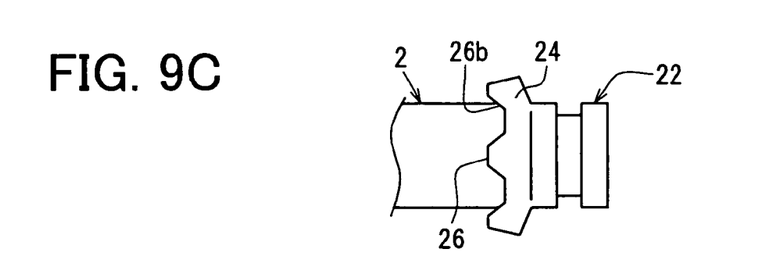

Alternatively, as shown in FIG. 9C, four rectangular-shaped grooves 26b can be formed at predetermined equal intervals on the rear end engagement portion 26 of the expanded portion 24 in a circumferential direction, and rectangular-shaped projections (not shown) opposed to the rectangular-shaped grooves 26b can be formed on the engagement portion 14.

Figure 9D:
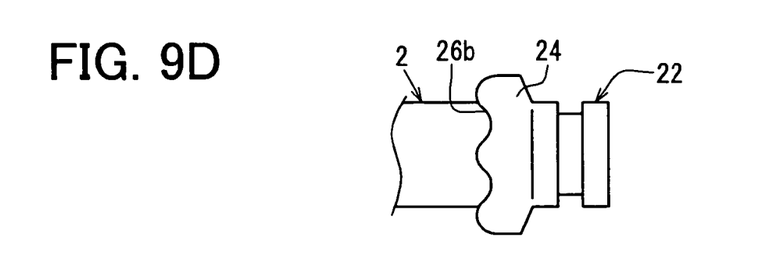

Alternatively, as shown in FIG. 9D, a plurality of wave-shaped grooves 26b can be formed at predetermined equal intervals on the rear end engagement portion 26 of the expanded portion 24 in a circumferential direction, and wave-shaped projections (not shown) opposed to the wave-shaped grooves 26b can be formed on the engagement portion 14.

Figure 9E:
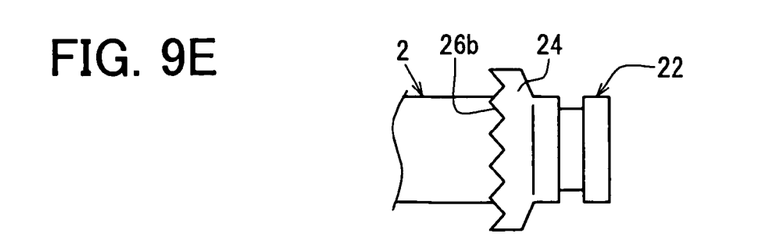

Further, as shown in FIG. 9E, a plurality of mountain-and-valley shaped grooves 26b can be formed at predetermined equal intervals on the rear end engagement portion 26 of the expanded portion 24 in a circumferential direction, and wave-shaped projections (not shown) opposed to the mountain-and-valley shaped grooves 26b can be formed on the engagement portion 14. The mountain-and-valley shaped grooves 26b may be shaped so that the rear end engagement portion 26 and the engagement portion 14 are brought into coarse-surface contact with each other.

According to the embodiment, the engaged surface step portions (26a, 26b) shaped in the above manner are formed on the rear end engagement portion 26 of the expanded portion 24 that is a member integral with the joint portion 22 of the first piping member 2. However, the engaged surface step portions (26a, 26b) shaped in the above manner may be formed on the expanded portion 24 of the above-described first embodiment.

Third Embodiment

In the above-described first and second embodiments, the present invention is typically applied to the piping joint device structured such that the first piping member 2 having a male joint is engaged through the window portions 38, which are formed on the second piping member 3 having a female joint, with the piping joint member 10 mounted to the second piping member 3. Here, the first piping member 2 is engaged with the piping joint member 10 through the window portions 38, by inserting the male joint of the first piping member 2 into the second piping member 3.

Figure 10:
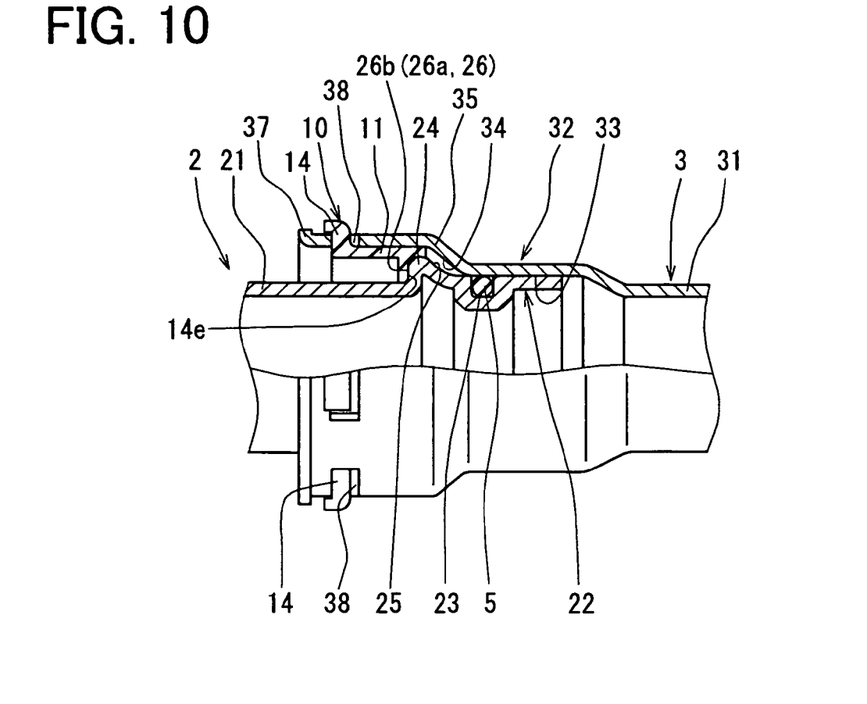
FIG. 10 is a partial cross-sectional view showing a construction of a piping joint device according to a third embodiment of the present invention.
Figure 11:
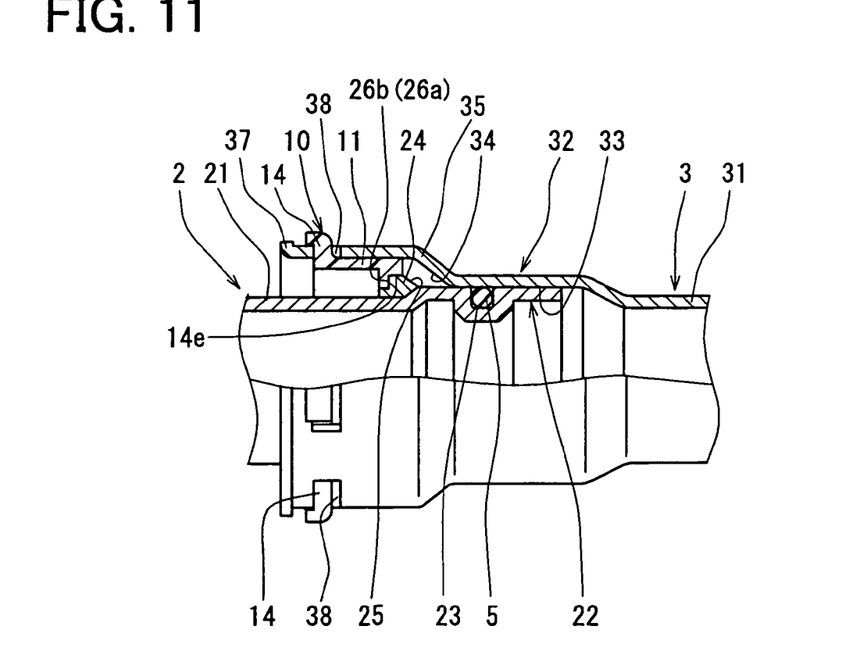
FIG. 11 is a partial cross-sectional view showing a construction of a piping joint device according to a modification of the third embodiment of the present invention.

In the third embodiment, a piping joint device 1 is structured such that a piping joint member 10 that is a piping joint is mounted to a first piping member 2, the first piping member 2 is connected to a second piping member 3 by inserting a male joint into the second piping member 3, and the piping joint member 10 engages with the second piping member 3 through window portions 38, which are formed in the second piping member 3. FIGS. 10 and 11 shows examples of the third embodiment.

Specifically, as shown in FIG. 10, the expanded portion 24 is provided in the joint portion 22 of the first piping member 2, similarly to the second embodiment. Furthermore, one end portion of the piping joint member 10 is mounted to an expanded portion 24 so as to be arranged on an outer periphery of the first piping member 2 on an opposite side to the expanded portion 24. When the first piping member 2 is connected to the second piping member 3 with a male joint inserted into the second piping member 3, engagement portions 14 on the other side are engaged with the window portions 38, which are formed in the second piping member 3.

Furthermore, a step surface between a cylinder 21 arranged rearwardly of the expanded portion 24 and the expanded portion 24 is formed on the first piping member 2 as a rear end engagement portion 26 (fixing portion) to be fixed to the one end portion of the piping joint member 10. Four concave-shaped grooves 26b are formed at predetermined equal intervals on the rear end engagement portion 26 in a circumferential direction, similarly to the above-described second embodiment.

Convex-shaped projections 14e opposed to the convex-shaped grooves 26b are formed on an opposite side of the piping joint member 10 relative to the engagement portion 14.

The piping joint member 10 is formed so that the projections 14e can be fitted with and fixed to the grooves 26b of the engagement portion 26.

The piping joint member 10 can be formed integrally from a resin material, or a metallic material, or a mixture of a resin material and a metallic material to be elastic in an axial direction and a radial direction. Further, the piping joint member 10 is formed to be thin-walled and ring-shaped so as to be mounted on an outer periphery of the first piping member 2. Similarly to the above-described first embodiment, first slot portions 12 are formed to be opened at end surfaces from one end of a first body ring portion 11 and are arranged in symmetric positions on a circumference.

The first slot portions 12 are formed to extend from a left end of the first body ring portion 11 to a neighborhood of a right end thereof, and opened at a left end thereof. The first slot portions 12 are formed in pair to be opposed to each other in symmetric positions with respect to an axis of the first body ring portion 11.

The engagement portions 14 projecting toward the window portions 38 are formed on the thin wall portions, on which the slot portions are not formed, on both ends of the first body ring portion 11. A set of the engagement portions 14 are arranged on both sides from thin wall ends 11a of the first body ring portion 11, on which the first slot portions 12 are not formed, with the first slot portions 12 therebetween, and a set of the engagement portions 14 are formed in symmetric positions to project toward the window portions 38 and to be opposed to each other.

The set of the engagement portions 14 includes four engagement portions 14 formed on a circumference by forming slits 13 in circumferentially middle positions. In other words, the respective engagement portions 14 are outwardly enlarged in diameter prior to connection to the second piping member 3. The respective engagement portions 14 are reduced in diameter toward an axis thereof when the first piping member 2 is connected to the second piping member 3 with a male joint inserted thereinto, and are enlarged in diameter to be engaged with the window portions 38 when the respective engagement portions 14 are inserted into the window portions 38.

An inner peripheral side of the one end portion of the first body ring portion 11 is provided with convex-shaped projections 14e to be opposed to the concave-shaped grooves 26b formed on the expanded portion 24 of the first piping member 2.

With such construction, the piping joint member 10 can be fixed to an outer peripheral side of the first piping member 2 in the vicinity of the expanded portion 24 prior to connection to the second piping member 3. When the first piping member 2 and the second piping member 3 are connected to each other, the engagement portions 14 are inserted into the window portions 38 to be engaged therewith. Accordingly, the projections 14e are held in the grooves 26b, and the engagement portions 14 are engaged with the window portions 38 whereby the detent function of the first piping member 2 and the second piping member 3 can be obtained.

In other words, in the piping joint device in which the piping joint member 10 is mounted on the first piping member 2 and the engagement portions 14 are engaged with the window portions 38 of the second piping member 3, the function of connection of piping and the function of detent can be made compatible with each other by providing the projections 14e and the grooves 26b. Here, both of the projections 14e and the grooves 26b form a detent portion, in a connection portion in which the piping joint member 10 is fixed to the first piping member 2. Accordingly, a rotation of the first piping member 2 and the second piping member 3 can be prevented without an increase in the number of parts.

In the example shown in FIG. 10, the concave-shaped grooves 26b are formed on the expanded portion 24, which is formed integral with the first piping member 2. However, a separate fixed member 24 can be formed instead of the expanded portion 24 of FIG. 10 and concave-shaped grooves 26b can be formed on the fixed member 24 as shown in FIG. 11.

Although the present invention has been described in connection with some preferred embodiments thereof with reference to the accompanying drawings, it is to be noted that various changes and modifications will become apparent to those skilled in the art.

For example, in the above-described embodiments, the present invention is typically applied to a refrigerant piping in a refrigerating cycle for vehicular air conditioning; however, the present invention can be applicable to a piping, in which a fluid is charged.

Such changes and modifications are to be understood as being within the scope of the present invention as defined by the appended claims.

What is claimed is:

1. A piping joint device comprising:
a first piping member having a male joint;
a second piping member having a female joint;
a piping joint member including: a body portion with an approximately cylindrical shape having a plurality of slot portions which are positioned at equal intervals from an axis and extend axially from an end surface of the body portion; and a plurality of diametrically deformable engagement portions provided on a circumference of the body portion extending toward the axis, at positions where the slot portions are not provided;
an extension cylinder portion formed on an end of the second piping member integral with the female joint, and extending toward the first piping member; and
a plurality of window portions provided in the extension cylinder portion along a circumferential direction of the extension cylinder portion engaged with the engagement portions, wherein:
the engagement portions deform when the male joint of the first piping member is inserted into the female joint of the second piping member;
the piping joint member and the first piping member are each provided with a detent portion at an engagement position where the engagement portions engage with the first piping member;
an engaged portion provided on an outer periphery of a root portion of the male joint of the first piping member engages with the engagement portions, wherein:
the detent portions are constructed with a first step portion provided on the engagement portions, and a second step portion provided on the engaged portion and opposite to the first step portion engages with the first step portion;
the first step portion is fitted with the second step portion to prevent a rotation of the first piping member and the second piping member; and
the first piping member and the second piping member are connected to each other.

2. The piping joint device according to claim 1, wherein the engaged portion is formed separate from the first piping member to have a substantially cylindrical shape, and is fixed to an outer periphery of the first piping member.

3. The piping joint device according to claim 1, wherein:
the engaged portion includes an expanded portion provided integral with the root portion of the male joint of the first piping member to engage with the engagement portions, wherein:
the detent portions are constructed with the first step portion provided on the engagement portions, and the second step portion provided on the expanded portion and opposite to the first step portion to be engaged with the first step portion.

4. A piping joint device comprising:
a first piping member having a male joint;
a second piping member having a female joint;
a piping joint member including: a body portion with an approximately cylindrical shape having a plurality of slot portions which are positioned at equal intervals from an axis and extend axially from an end surface of the body portion; and a plurality of diametrically deformable engagement portions provided on a circumference of the body portion extending toward the axis, at positions where the slot portions are not provided;
an extension cylinder portion formed on an end of the second piping member integral with the female joint, and extending toward the first piping member; and
a plurality of window portions provided in the extension cylinder portion along a circumferential direction of the extension cylinder portion engaged with the engagement portions, wherein:
the engagement portions deform when the male joint of the first piping member is inserted into the female joint of the second piping member;
the piping joint member and the first piping member are each provided with a detent portion at an engagement position where the engagement portions engage with the first piping member; wherein
the piping joint member is located on an outer periphery of the second piping member such that the engagement portions are inserted into the window portions and are engaged with the first piping member in the circumferential direction; and
the detent portions preventing a rotation of the first piping member and the second piping member which are connected to each other.

5. The piping joint device according to claim 4, further comprising:
an expanded portion provided integral with a root portion of the male joint of the first piping member to engage with the engagement portions, wherein:
the detent portions are constructed with a first step portion provided on the engagement portions, and a second step portion provided on the expanded portion and opposite to the first step portion to be engaged with the first step portion; and
the first step portion is fitted with the second step portion to prevent the rotation of the first piping member and the second piping member.

6. The piping joint device according to claim 5, wherein the engaged portion is formed separate from the first piping member to have a substantially cylindrical shape, and is fixed to an outer periphery of the first piping member.

7. The piping joint device according to claim 4, further comprising: an engaged portion provided on an outer periphery of a root portion of the male joint of the first piping member engaged with the engagement portions, wherein:
the detent portions are constructed with a first step portion provided on the engagement portions, and a second step portion provided on the engaged portion and opposite to the first step portion to be engaged with the first step portion; and
the first step portion is fitted with the second step portion to prevent the rotation of the first piping member and the second piping member.

* * * * *

UNITED STATES PATENT AND TRADEMARK OFFICE
CERTIFICATE OF CORRECTION

PATENT NO.       : 7,611,171 B2                                      Page 1 of 1
APPLICATION NO. : 11/396995
DATED            : November 3, 2009
INVENTOR(S)      : Makoto Yoshino It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 739 days.

Signed and Sealed this

Fourteenth Day of December, 2010

David J. Kappos
*Director of the United States Patent and Trademark Office*